United States Patent
VanDam (10) Patent No.: US 12,263,695 B2
(45) Date of Patent: Apr. 1, 2025

(54) ENHANCED LATE POINT FEATURE DIFFERENTIATION

(71) Applicant: Hewlett-Packard Development Company, L.P., Spring, TX (US)

(72) Inventor: Charles M. VanDam, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/143,379

(22) Filed: May 4, 2023

(65) Prior Publication Data

US 2023/0271446 A1 Aug. 31, 2023

Related U.S. Application Data

(63) Continuation of application No. 16/604,183, filed as application No. PCT/US2018/039855 on Jun. 27, 2018, now Pat. No. 11,679,617.

(51) Int. Cl.
| | |
|---|---|
| B42D 25/378 | (2014.01) |
| B41M 3/14 | (2006.01) |
| B42D 25/405 | (2014.01) |
| B65D 5/42 | (2006.01) |
| G06Q 10/083 | (2024.01) |
| H04L 41/0803 | (2022.01) |

(52) U.S. Cl.
CPC ............ *B42D 25/378* (2014.10); *B41M 3/146* (2013.01); *B42D 25/405* (2014.10); *H04L 41/0803* (2013.01)

(58) Field of Classification Search
CPC .... B42D 25/378; B42D 25/405; B41M 3/146; B41M 3/14; G06Q 10/083; B65D 5/4212; B65D 5/42; B65D 2203/02
USPC ........ 283/72, 74, 79, 81, 85, 88, 89, 90, 94, 283/98, 901
See application file for complete search history.

(56) References Cited

U.S. PATENT DOCUMENTS

| | | | |
|---|---|---|---|
| 6,373,965 B1 | 4/2002 | Liang | |
| 9,633,330 B1 | 4/2017 | Ali | |
| 2005/0111694 A1 | 5/2005 | Loce et al. | |
| 2005/0256807 A1 | 11/2005 | Brewington | |
| 2008/0121728 A1 | 5/2008 | Rodriguez | |
| 2008/0294536 A1 | 11/2008 | Taylor et al. | |
| 2009/0014517 A1 | 1/2009 | Gelbman | |
| 2013/0223279 A1 | 8/2013 | Tinnakornsrisuphap et al. | |

(Continued)

FOREIGN PATENT DOCUMENTS

| | | |
|---|---|---|
| CN | 106971214 A | 7/2017 |
| EP | 1674286 A1 | 6/2006 |
| WO | 2017/002475 A1 | 1/2017 |

*Primary Examiner* — Justin V Lewis
(74) *Attorney, Agent, or Firm* — Michael Dryja (57) ABSTRACT

An example container includes: structure having an interior and an exterior. The interior is to contain an electronic product. The exterior comprises: a first label of a first type of polychromatic ink to be activated at a first wavelength; and a second label of a second type of polychromatic ink to be activated at a second wavelength different from the first wavelength; the first label to indicate a first set of features to be configured at the electronic product using a first wireless signal; and the second label to indicate a second set of features to be configured at the electronic product using a second wireless signal. The structure is transparent to the first wireless signal and the second wireless signal.

15 Claims, 5 Drawing Sheets

(56) References Cited

U.S. PATENT DOCUMENTS

| | | |
|---|---|---|
| 2015/0302421 A1 | 10/2015 | Caton et al. |
| 2017/0106691 A1 | 4/2017 | Philippe et al. |
| 2017/0341834 A1 | 11/2017 | Warden et al. |
| 2019/0180222 A1* | 6/2019 | Keddie ................. H04L 9/3226 |

* cited by examiner

ENHANCED LATE POINT FEATURE DIFFERENTIATION

BACKGROUND

Products, including electronic products, are often shipped to different locations and/or configured according to a location to which the product is to be shipped. Labelling containers and/or sealed containers containing the electronic products close to a shipping event can be challenging when the electronic product is electronically configured in the container just prior to shipping. Similarly, containers of the products are often manually labelled indicating the configuration and/or the location which can lead to wasted resources and/or shipping costs when the location and/or configuration of the label does not match the product in the container.

BRIEF DESCRIPTION OF THE DRAWINGS

Reference will now be made, by way of example only, to the accompanying drawings in which.

DETAILED DESCRIPTION

Features of electronic products shipped in containers are often configurable to different hardware and/or software settings at a late point in a manufacturing and/or shipping process (e.g. just prior to shipping) using a scanner which wirelessly communicates with the electronic products to configure the features. Such configuration differentiates the features of the electronic products at the late point in the shipping process, and the like. For example, such features may be selected based on a region to which the electronic products are to be shipped. However, the electronic product is often both configured and packaged in a container based upon a forecast of where it may be shipped before it is determined where the electronic product will be shipped and/or how the electronic product is to be configured, which may result in either excess or shortages of the electronic product relative to actual demand, (e.g. when the forecast changes and/or is not accurate). While it is possible to electronically configure or "bifflip" the product remotely (e.g. from outside of the container) at some point after the electronic product has been manufactured and placed in a container for shipment (or sale), the container would at that later point have to be marked or have its configuration and/or shipping location differentiated manually, for example by affixing labels to the containers, checking checkboxes, or the like. Even if the containers are labelled and/or marked by machines, after the electronic configuration, the process is dependent on a human configuring the machines to accurately perform the labelling and/or marking. Such dependency can lead to errors in the labelling and/or marking, and incorrectly labelled containers may be shipped to regions where the electronic products contained therein are not intended for use, which can result in the electronic products being shipped back to source or discarded. Furthermore, the labelling and/or marking machinery would generally need to be in close proximity to the container, or make physical contact with the container, in order to apply a label or ink to the container. Hence, the machinery and process for labelling or inking the container can also be a limiting factor in terms of how quickly and cost effectively the containers can be shipped.

Figure 1:
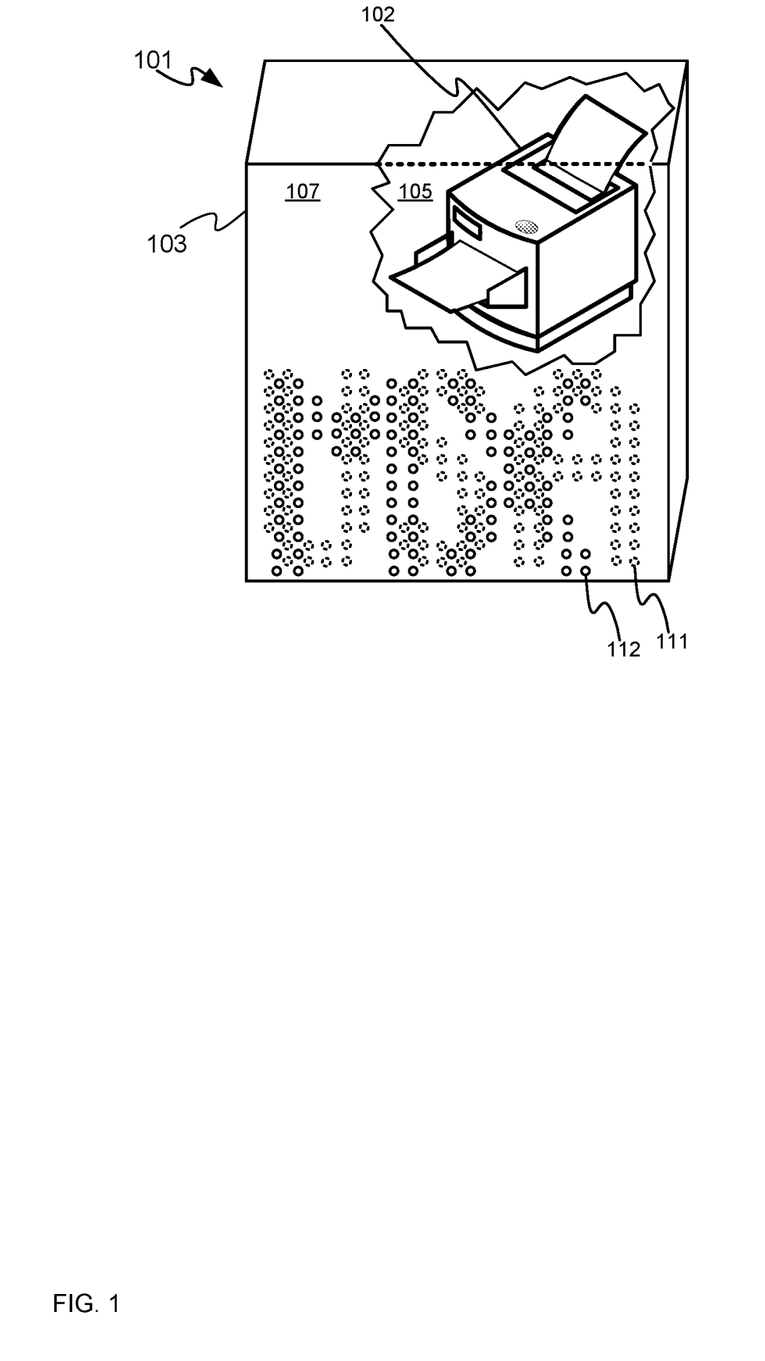
FIG. 1 is a diagram of an example container to enhance late point feature differentiation.

Hence, provided herein is a container that includes two labels each of a respective type of polychromatic ink that may be activated at different wavelengths in tandem with configuring respective features of an electronic product contained in the container. Also provided herein is an apparatus that includes light sources to activate the respective types of polychromatic ink and a circuit to emit wireless signals to configure features of the electronic product;

Referring to FIG. 1, a container 101 to enhance late point feature differentiation is depicted. The container 101 may include a box, and the like to contain and ship an electronic product 102, shown in a cutaway view in FIG. 1. As depicted, the electronic product 102 contained in the container 101 is a printer, though containers for other types of electronic products are within the scope of present examples. The electronic product 102 is generally configurable within the container 101 using wireless signals, for example to bifflip circuits (not depicted), and the like, at the electronic product 102 to activate and/or configure hardware and/or software features of the electronic product 102.

The container 101 comprises: a structure 103 having an interior 105 and an exterior 107. The structure 103 includes a box, and the like, which may be opened, such that the electronic product 102 may be placed therein, and closed and/or sealed for shipping.

The interior 105 is to contain the electronic product 102. While the electronic product 102 is depicted, in the cutaway view, as occupying only a portion of the interior 105, the electronic product 102 may occupy a substantial portion of the interior 105, and a size and/or shape of the container 101 may be specifically adapted to contain the electronic product 102, as well as any packaging material (not depicted), instructions, and the like.

The exterior 107 comprises: a first label 111 of a first type of polychromatic ink to be activated at a first wavelength; and a second label 112 of a second type of polychromatic ink to be activated at a second wavelength different from the first wavelength. The first label 111 is to indicate a first set of features to be configured at the electronic product 102 using a first wireless signal; and the second label 112 is to indicate a second set of features to be configured at the electronic product 102 using a second wireless signal. The structure 103 is generally transparent to the first wireless signal and the second wireless signal so that the electronic product 102 may be configured while the electronic product 102 is contained in the container 101 and the container 101 is closed and/or sealed for shipping.

As depicted, each of the labels 111, 112 are dot matrix patterns, the dots of each of the dot matrix patterns depicted using different line types; for example, dots of the first label 111 are depicted in broken lines, while dots of the second label are depicted in solid lines.

While the labels 111, 112 are visible in FIG. 1, the labels 111, 112 are generally transparent and/or invisible to the human eye and/or a human vision system (e.g. a machine vision system to electronically view items according to human vision parameters) until activated and/or exposed to different wavelengths of light. Indeed, a person of skill in the art understands that each of the first type of polychromatic ink and the second type of polychromatic ink are one or more of transparent, and invisible to a human vision system, until respectively activated by the first wavelength and the second wavelength.

For example, each of the labels 111, 112 may be printed at the exterior 107 of the container 101 using respective polychromatic inks that are not visible until activated using ultraviolet light of different respective wavelengths. However, any type of polychromatic ink is within the scope of the present specification.

As depicted, the first type of polychromatic ink (and/or the first label 111) and the second type of polychromatic ink (and/or the second label 112) each comprise respective dot matrix patterns on the exterior 107, the respective dot matrix patterns interwoven with each other Hence, for example, the first label 111 comprises a first dot matrix pattern of dots of a first polychromatic ink that form the letters "USA", and the second label 112 comprises a second dot matrix pattern of dots of a second polychromatic ink that form the letters "MX", the second dot matrix pattern interwoven with the first dot matrix pattern. Hence, in this example, the electronic product 102 may be configured using a first wireless signal with features intended for use in the United States (e.g. as indicated by "USA" of the first label 111), or the electronic product 102 may be configured using a second wireless signal with features intended for use in Mexico (e.g. as indicated by "MX" of the second label 112). When the electronic product 102 is configured using the first wireless signal for use in the United States, the first label 111 is activated, and when the electronic product 102 is configured using the second wireless signal for use in Mexico, the second label 112 is activated, for example using an apparatus described below.

Hence, as depicted the first set of features is associated with a first region and the second set of features is associated with a second region, and the first label 111 and the second label 112 are to respectively indicate the first set of features and the second set of features by respectively indicating the first region and the second region, when respectively activated by the first wavelength and the second wavelength. However, the first label 111 and the second label 112 may indicate the respective features in any suitable manner using images, graphics, symbols, alphanumeric lettering, and the like.

Hence, for example, the first label 111 and the second label 112 are to respectively indicate the first set of features and the second set of features by alphanumerically indicating the first set of features and the second set of features (e.g. by indicating a region to which the electronic product 102 is to be shipped), when respectively activated by the first wavelength and the second wavelength.

Furthermore, while the labels 111, 112 are depicted as respective dot matrix patterns interwoven with each other, the labels 111, 112 may be separate from each other at the exterior 107. Furthermore, the labels 111, 112 may include labels different from dot matrix patterns, such as images, graphics, symbols, alphanumeric lettering, and the like. The depicted dot matrix patterns, however, may be printed in tandem using any type of printer that can prints dot of the two types of polychromatic ink (including, but not limited to, a dot matrix printer).

Figure 2:
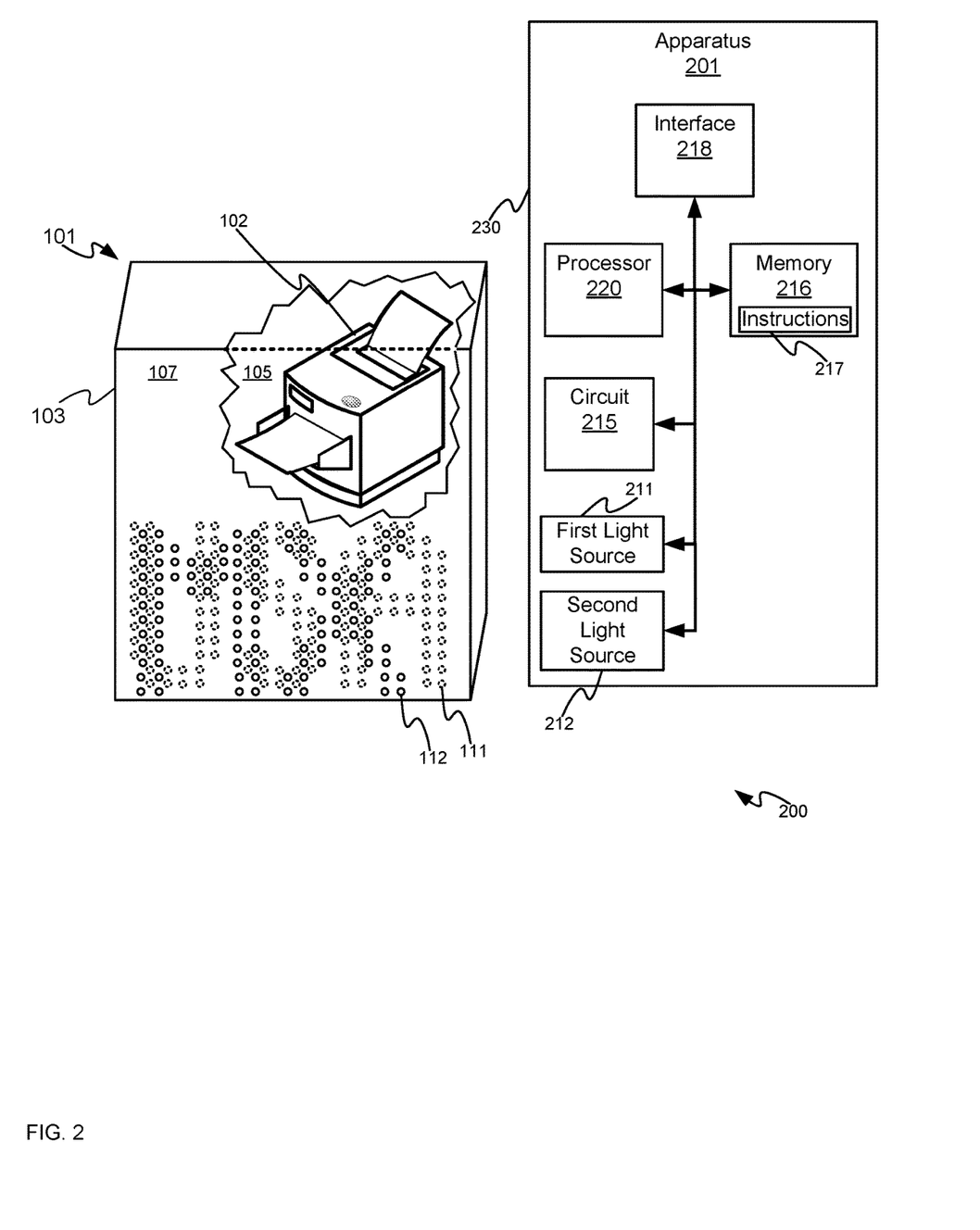
FIG. 2 is a block diagram of system that includes the example container of FIG. 1 and an example apparatus to enhance late point feature differentiation.

Attention is next directed to FIG. 2 which depicts a system 200 that includes the container 101 in use with an apparatus 201 to enhance late point feature differentiation, for example by both activating a respective label 111, 112 at the container 101 and configuring the electronic product 102, using a wireless signal, with a respective set of features that correspond to a label 111, 112 being activated. FIG. 2 depicts a schematic block diagram of the apparatus 201.

The apparatus 201 may include additional components, such as various additional interfaces and/or input/output devices such as displays to interact with a user or an administrator of the apparatus 201.

The apparatus 201 includes: a first light source 211 to emit a first wavelength to activate a first type of polychromatic ink; and a second light source 212 to emit a second wavelength to activate a second type of polychromatic ink. For example, the first light source 211 may be to emit a first wavelength to activate a first type of polychromatic ink of the first label 111, and the second light source 212 may be to emit a second wavelength to activate a second type of polychromatic ink of the second label 112.

The apparatus 201 further includes: a circuit 215 to emit a first wireless signal to configure a first set of features at the electronic product 102 and a second wireless signal to configure a second set of features at the electronic product 102, for example in a respective bitflip process.

The apparatus 201 further includes a memory 216 storing instructions 217, described in further detail below.

The apparatus 201 further includes an interface 218 to receive an indication to configure one of the first set of features and the second set of features at the electronic product 102.

The apparatus 201 further includes a processor 220 connected to the first light source 211, the second light source 212, the circuit 215, the memory 216 and the interface 218, the processor 220 to execute the instructions 217 stored in the memory 216, the instructions 217 to: when the indication (e.g. as received via the interface 218) indicates that the first set of features are to be configured at the electronic product 102, control the circuit 215 to emit the first wireless signal and control the first light source 211 to emit the first wavelength; and when the indication indicates that the second set of features are to be configured at the electronic product 102, control the circuit 215 to emit the second wireless signal and control the second light source 212 to emit the second wavelength.

The apparatus 201 further generally comprises a housing 230 which may contain the components of the apparatus 201. The light sources 211, 212 may be contained in the housing 230, the housing 230 being adapted with apertures, and the like, through which respective wavelengths of the light sources 211, 212 are emitted; alternatively, the light sources 211, 212 may be mounted external to the housing 230. The housing 230 is further transparent to the wireless signals emitted by the circuit 215 and/or components of the circuit 215 which emit wireless signals that may be mounted external to the housing 230.

In some examples the interface 218 may comprise one or more of a switch and a manually operated input device, and the like, used to manually change the apparatus 201 between a first mode and a second mode. Hence, the indication received by the interface 218 may indicate a position of the switch, and the like. In the first mode, the processor 220 controls the circuit 215 to emit the first wireless signal and control the first light source 211 to emit the first wavelength. In the second mode, the processor 220 controls the circuit 215 to emit the second wireless signal and control the second light source 212 to emit the second wavelength. Hence, in this example, the indication to configure one of the first set of features and the second set of features at the electronic product 102 comprises a setting of the switch. In these examples, the housing 230 may be a hand-held housing and/or the apparatus 201 may comprise a hand-held housing.

The switch (and/or manually operated input device), may further be biased to a neutral position, and when the switch is manually activated to control the apparatus 201 to the first mode or the second mode, the apparatus 201 may further be turned on to emit a wireless signal and a corresponding wavelength. Alternatively, the apparatus 201 may include an on/off switch, and the like, which, when activated, causes the apparatus to emit a wireless signal and a corresponding wavelength depending on the position of the switch.

In other examples, the interface 218 may be one or more of a wireless interface, a wired interface, and a network interface to communicate with a remote device, and the indication received by the interface 218 may be wired and/or wireless signal to switch the apparatus 201 between the first mode and the second mode. The interface 218 may hence be to communicate with a network such as a wired or wireless network which may include one or more of a cellular network, a WiFi network, and the like. For example, the housing 230 may be to mount the apparatus 201 adjacent a conveyor belt conveying the container 101, the apparatus 201 being remotely controlled via the indication to activate one of the labels 111, 112 and respective features of the electronic product 102 depending on where the container 101 is to be shipped.

The circuit 215 may comprise a near field communication (NFC) circuit and the like, and/or any type of circuit to emit signals to configure features at the electronic product 102 using bitflipping and the like. Hence, each of the first wireless signal and the second wireless signal may be to bitflip a circuit, and the like, at the electronic product 102 to respectively activate the first set of features and the second set of features.

Each of the light sources 211, 212 may comprise a respective set of one or more light emitting diodes (LEDs), and the like, to emit respective wavelengths to activate the labels 111, 112. However, the light sources 211, 212 may be one type of one or more LEDs which emits both the first wavelength and the second wavelength depending a bias voltage, and the like, applied to the one or more LEDs. While the light sources 211, 212 are depicted as separate from one another, the light sources 211, 212 may alternatively be integrated with one another.

The memory 216 also stores and/or is encoded with the instructions 217 executable by the processor 220 to enhance late point feature differentiation. The processor 220 is to execute the instructions 217 stored in the memory 216, the instructions 217 to: when the indication (e.g. received via the interface 218) indicates that the first set of features are to be configured at the electronic product 102, control the circuit 215 to emit the first wireless signal and control the first light source 211 to emit the first wavelength; and when the indication indicates that the second set of features are to be configured at the electronic product 102, control the circuit 215 to emit the second wireless signal and control the second light source 212 to emit the second wavelength.

The memory 216 is coupled to the processor 220 and may include a non-transitory machine-readable storage medium that may be any electronic, magnetic, optical, or other physical storage device. The non-transitory machine-readable storage medium may include, for example, random access memory (RAM), electrically-erasable programmable read-only memory (EEPROM), flash memory, a storage drive, an optical disc, and the like. The memory 216 may also be encoded with executable instructions to operate the light sources 211, 212, the circuit 215, the interface 218 and other hardware in communication with the processor 220. In other examples, it is to be appreciated that the memory 216 may be substituted with a cloud-based storage system.

The memory 216 may also store an operating system that is executable by the processor 220 to provide general functionality to the apparatus 201, for example, functionality to support various applications such as a user interface to access various features of the apparatus 201. Examples of operating systems include Windows™ macOS™, iOS™, Android™, Linux™, and Unix™. The memory 216 may additionally store applications that are executable by the processor 220 to provide specific functionality to the apparatus 201, such as those described in greater detail below and which may include the instructions 217.

The processor 220 may include a central processing unit (CPU), a microcontroller, a microprocessor, a processing core, a field-programmable gate array (FPGA), or similar. The processor 220 and memory 216 may cooperate to execute various instructions such as the instructions 217.

The instructions 217 may be further to: receive the indication from one or more of a switch and manually operated input device (e.g. when the interface 218 comprises one or more of a switch and a manually operated input device).

The instructions 217 may be further to: receive the indication from one or more of a wired interface and a wired interface (e.g. when the interface 218 comprises one or more of a wired interface and a wired interface, and/or a network interface).

The instructions 217 may be further to: control the circuit 215 to emit the first wireless signal and the second wireless signal for a given time period, only one of the first wireless signal and the second wireless signal being emitted during the given time period; and control the first light source 211 and the second light source 212 to respectively emit the first wavelength and the second wavelength for the given time period, only one of the first wavelength and the second wavelength being emitted during the given time period. For example, when the circuit 215 is controlled to emit one of the first wireless signal and the second wireless signal and one of the light sources 211, 212 is controlled to emit a respective wavelength, the wireless signal and the respective wavelength may be emitted for the given time period, which may be selected based on one or more of: a time to activate the polychromatic ink of the labels 111, 112; and a time to configure the electronic product 102 using the wireless signals.

Figure 3:
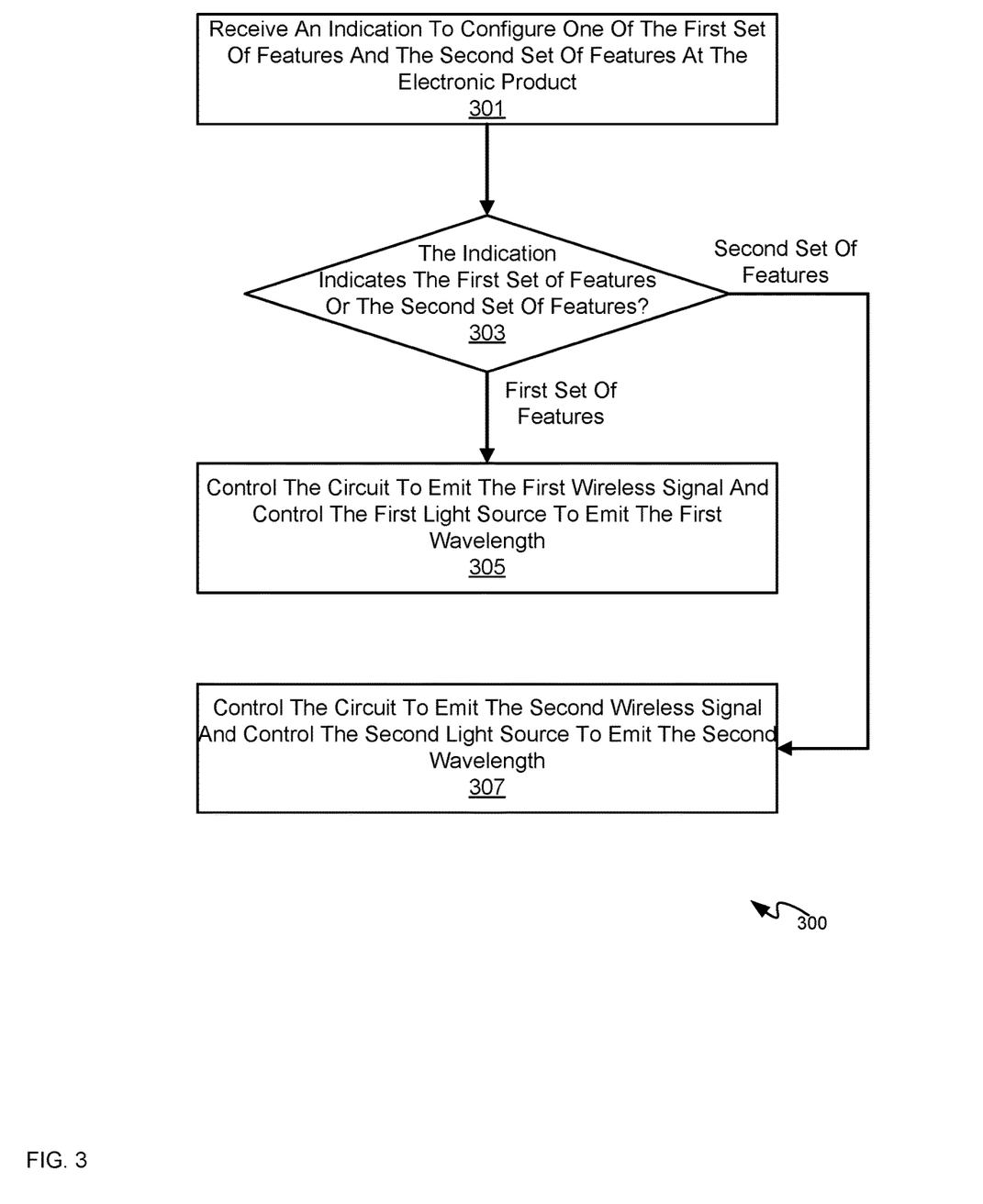
FIG. 3 is a flowchart of an example of a method to enhance late point feature differentiation.

Referring to FIG. 3, a flowchart of a method 300 to enhance late feature differentiation is depicted. In order to assist in the explanation of method 300, it will be assumed that method 300 may be performed with the apparatus 201, and specifically by the processor 220. Indeed, the method 300 may be one way in which apparatus 201 may be configured to interact with the container 101 and the electronic product 102 contained therein. Furthermore, the following discussion of method 300 may lead to a further understanding of the processor 220, and apparatus 201 and its various components, as well as the container 101. Furthermore, it is to be emphasized, that method 300 may not be performed in the exact sequence as shown, and various blocks may be performed in parallel rather than in sequence, or in a different sequence altogether.

At a block 301, the processor 220 receives, for example from the interface 218, an indication to configure one of the first set of features and the second set of features at the electronic product 102.

At a block 303, the processor 220 determines whether the indication indicates that the first set of features or the second set of features are to be configured at the electronic product 102. For example, the processor 220 may determine that a switch and/or a manually operated input device is in a given position and/or the processor 220 may determine whether an indication received via a wired interface and/or wireless interface and/or network interface is indicative of the first set of features or the second set of features.

When the indication indicates that the first set of features are to be configured at the electronic product 102 (e.g. a decision "First Set Of Features" at the block 303), at a block 305, the processor 220 controls the circuit 215 to emit the first wireless signal and controls the first light source 211 to emit the first wavelength.

Similarly, when the indication indicates that the second set of features are to be configured at the electronic product 102 (e.g. a decision "Second Set Of Features" at the block 303), at a block 307, the processor 220 controls the circuit 215 to emit the second wireless signal and controls the second light source 212 to emit the second wavelength.

Figure 4:
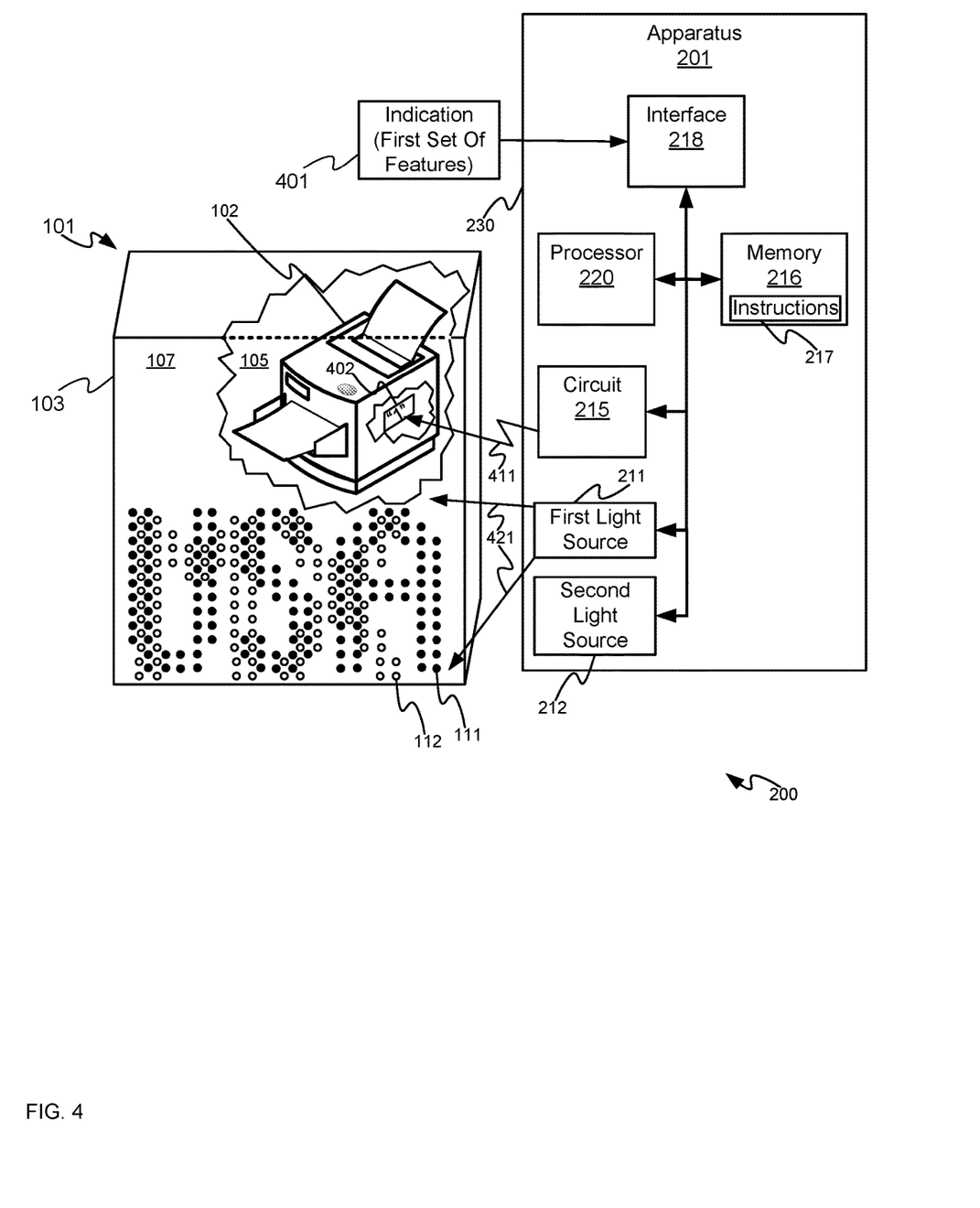
FIG. 4 depicts the system of FIG. 2 operated in a first mode to enhance late point feature differentiation.

Referring to FIG. 4, which is substantially similar to FIG. 2 with like elements having like numbers, FIG. 4 depicts the interface 218 receiving an indication 401 that a first set of features are to be activated at the electronic product 102, for example at a circuit 402 of the electronic product 102 shown in a cutaway view at the electronic product 102 in FIG. 4. The indication 401 is received at the processor 220 and the processor 220 responsively controls the circuit 215 to emit a first wireless signal 411 for configuring the circuit 402 of the electronic product 102 to the first set of features as indicated by "1" on the circuit 402 of the electronic product 102. The processor 220 further controls the first light source 211 to emit light 421 of a first wavelength that irradiates the labels 111, 112. As the first wavelength is selected to activate the polychromatic ink of the first label 111, the dot matrix pattern of the first label 111 changes color (e.g. from transparent to black) such that the letters "USA" are visible to a human vision system. A person of skill in the art understands that the first features as indicated by "1" on the circuit 402 are features that are to be used in the United States. The second label 112 remains transparent and/or invisible to a human vision system as the second label 112 is activated by a second wavelength different from the first wavelength. Hence, the apparatus 201 simultaneously configures the electronic product 102 to the first set of features and activates the respective label 111 at the exterior 107 of the structure 103 of the container 101. In some examples the first wireless signal 411 and the light 421 of the first wavelength are emitted for a given time period.

Figure 5:
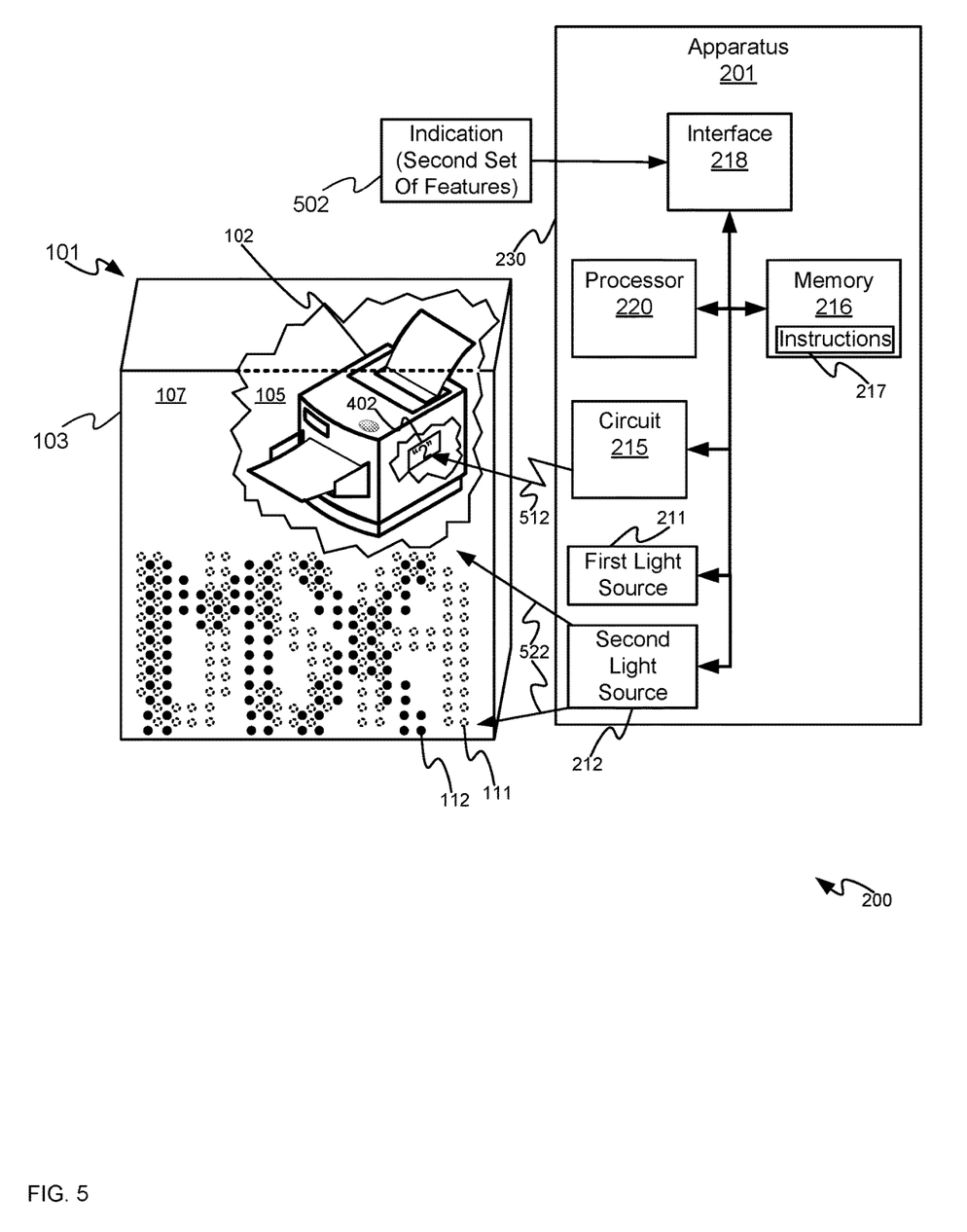
FIG. 5 depicts the system of FIG. 2 operated in a second mode to enhance late point feature differentiation.

Referring to FIG. 5, which is substantially similar to FIG. 4 with like elements having like numbers, FIG. 5 depicts the interface 218 receiving an indication 502 that a second set of features are to be activated at the electronic product 102, for example at the circuit 402 of the electronic product 102. The indication 502 is received at the processor 220 and the processor 220 responsively controls the circuit 215 to emit a second wireless signal 512 for configuring the circuit 402 of the electronic product 102 to the second set of features as indicated by "2" on the circuit 402 of the electronic product 102. The processor 220 further controls the second light source 212 to emit light 522 of a second wavelength that irradiates the labels 111, 112. As the second wavelength is selected to activate the polychromatic ink of the second label 112, the dot matrix pattern of the second label 112 changes color (e.g. from transparent to black) such that the letters "MX" are visible to a human vision system. A person of skill in the art understands that the second features as indicated by "2" on the circuit 402 are features that are to be used in Mexico. The first label 111 remains transparent and/or invisible to a human vision system as the first label 111 is activated by the first wavelength different from the second wavelength. Hence, the apparatus 201 simultaneously configures the electronic product 102 to the second set of features and activates the respective label 112 at the exterior 107 of the structure 103 of the container 101. In some examples the second wireless signal 512 and the light 522 of the second wavelength are emitted for a given time period.

Hence, depending on whether the electronic product 102 is to be shipped to the United States or Mexico, the electronic product 102 may be configured using one of the wireless signals 411, 512 emitted by the circuit 215 just prior to shipping and the corresponding label 111, 112 may be activated in tandem with configuring the electronic product 102. Hence, the electronic product 102 may be enhanced at a late point in the manufacturing and/or shipping cycle with particular features, for example for a particular region, that differentiate the electronic product 102 from other electronic products shipped to other regions, and the container 101 labelled accordingly using the apparatus 201.

In some examples, the apparatus 201 may be used to configure a plurality of electronic products 102 contained in respective containers 101 at once, as long as the containers 101 are arranged in a manner where the signals 411, 512 are transmitted to each of the plurality of electronic products 102 and respective labels 111, 112 of each of the respective containers 101 are visible to the light 421, 522.

In some examples, the container 101 may contain a non-electronic product and one of the labels 111, 112 is activated depending on a region to which the non-electronic product is to be shipped. Hence, the container 101 may also be used for indicating where to ship the non-electronic product late in the shipping cycle.

In further examples, configuration of an electronic product 102 may be region independent and/or not region-dependent and similarly, the labels 111, 112 may be region independent and/or not region-dependent. For example, just prior to shipping, the container 101, an inventory system and/or a shipping system, and the like, may determine that demand for a first set of features of the electronic product 102 associated with the label 111 is higher than demand for a second set of features of the electronic product 102 associated with the label 112. Hence, one of the sets of features of the electronic product 102 configured just prior to shipping and the corresponding label 111, 112 is activated accordingly, as described above.

It should be recognized that features and aspects of the various examples provided above may be combined into further examples that also fall within the scope of the present disclosure.

The invention claimed is:

1. A container comprising:
a structure having an interior and an exterior;
the interior to contain an electronic product;
the exterior comprising: a first label printed with a first type of polychromatic ink to be activated at a first wavelength; and a second label printed with a second type of polychromatic ink to be activated at a second wavelength different from the first wavelength; the first label to indicate a first set of features of the electronic product to be configured at the electronic product using a first wireless signal; and the second label to indicate a second set of features of the electronic product to be configured at the electronic product using a second wireless signal; and the structure being transparent to the first wireless signal and the second wireless signal, wherein the first label indicates the first set of features when the first type of polychromatic ink is activated by the first wavelength, and wherein the second label indicates the second set of features when the second type of polychromatic ink is activated by the second wavelength.

2. The container of claim 1, wherein the first set of features is associated with a first geographic region and the second set of features is associated with a second geographic region.

3. The container of claim 2, wherein the first label indicates the first set of features by alphanumerically indicating the first geographic region when the first type of polychromatic ink is activated by the first wavelength, and wherein the second label indicates the second set of features by alphanumerically indicating the second geographic region when the second type of polychromatic ink is activated by the second wavelength.

4. The container of claim 1, wherein the first type of polychromatic ink and the second type of polychromatic ink comprise respective dot matrix patterns on the exterior.

5. The container of claim 4, wherein the respective dot matrix patterns are interwoven with each other.

6. An apparatus comprising:
a first light source to emit a first wavelength to activate a first type of polychromatic ink with which a first label of an electronic product has been printed;
a second light source to emit a second wavelength to activate a second type of polychromatic ink with which a second label of the electronic product has been printed;
a circuit to emit a first wireless signal to configure a first set of features of the electronic product indicated by the first label and a second wireless signal to configure a second set of features of the electronic product indicated by the second label;
a memory storing instructions;
an interface to receive an indication to configure one of the first set of features and the second set of features at the electronic product; and
a processor connected to the first light source, the second light source, the circuit, the interface and the memory, the processor to execute the instructions stored in the memory, the instructions comprising: when the indication indicates that the first set of features are to be configured at the electronic product, controlling the circuit to emit the first wireless signal and controlling the first light source to emit the first wavelength to activate the first label; and when the indication indicates that the second set of features are to be configured at the electronic product, controlling the circuit to emit the second wireless signal and control the second light source to emit the second wavelength to activate the second label.

7. The apparatus of claim 6, further comprising a handheld housing.

8. The apparatus of claim 6, further comprising a housing to mount the apparatus adjacent a conveyor belt.

9. The apparatus of claim 6, wherein the interface comprises either or both of a switch and a manually operated input device.

10. The apparatus of claim 6, wherein the interface comprises either or both of a wireless interface and a wired interface.

11. A non-transitory machine-readable storage medium encoded with instructions executable by a processor, the non-transitory machine-readable storage medium comprising:
instructions comprising: receiving an indication to configure one of a first set of features and a second set of features at an electronic product having a first label and a second label;
instructions comprising: when the indication indicates that the first set of features are to be configured at the electronic product, controlling a circuit to emit a first wireless signal to configure the first set of features at the electronic product and controlling a first light source to emit a first wavelength to activate a first type of polychromatic ink with which the first label has been printed; and
instructions comprising: when the indication indicates that the second set of features are to be configured at the electronic product, controlling the circuit to emit a second wireless signal to configure the second set of features at the electronic product and controlling a second light source to emit a second wavelength to activate a second type of polychromatic ink with which the second label has been printed.

12. The non-transitory machine-readable storage medium of claim 11, further comprising instructions comprising: receiving the indication from either or both of a switch and manually operated input device.

13. The non-transitory machine-readable storage medium of claim 11, further comprising instructions comprising: receiving the indication from either or both of a wired interface and a wired interface.

14. The non-transitory machine-readable storage medium of claim 11, further comprising instructions comprising: controlling the circuit to emit the first wireless signal and the second wireless signal for a given time period, only one of the first wireless signal and the second wireless signal being emitted during the given time period; and controlling the first light source and the second light source to respectively emit the first wavelength and the second wavelength for the given time period, only one of the first wavelength and the second wavelength being emitted during the given time period.

15. The non-transitory machine-readable storage medium of claim 11, wherein the first wireless signal bitflips a circuit at the electronic product to activate the first set of features,
and wherein the second wireless signal bitflips the circuit at the electronic product to activate the second set of features.

* * * * *